United States Patent [19]

Velte

[11] 3,878,277
[45] Apr. 15, 1975

[54] SEAT CUSHIONS AND IN METHODS AND DEVICES FOR THEIR MANUFACTURE

[75] Inventor: Jean Velte, Brieres-les-Scelles, France

[73] Assignee: Etablissements Bertrand Faure, Puteaux, France

[22] Filed: Oct. 23, 1973

[21] Appl. No.: 408,265

[30] Foreign Application Priority Data
Oct. 24, 1972 France .............................. 72.37677
Mar. 1, 1973 France .............................. 73.07303

[52] U.S. Cl. ............ 264/46.4; 5/361 B; 297/DIG. 2
[51] Int. Cl. ......................... B29d 7/20; A47c 23/00
[58] Field of Search ............ 5/345, 355, 361, 361 B; 297/452, 456, DIG. 1, DIG. 2; 29/91.1, 91.8; 264/45

[56] References Cited
UNITED STATES PATENTS
2,744,340  5/1956  Gerber .............................. 264/45 X
3,102,755  9/1963  Wilfert ............................. 5/353.2 X
3,142,515  7/1964  Wall et al. ....................... 297/456 X
3,204,016  8/1965  Sanger et al. ......................... 264/45
3,462,776  8/1969  Cox ...................................... 5/337
3,519,308  7/1970  Kasman et al. ..................... 297/452
3,713,696  1/1973  Dudley ......................... 297/DIG. 1

*Primary Examiner*—Paul R. Gilliam
*Assistant Examiner*—Andrew M. Calvert
*Attorney, Agent, or Firm*—Larson, Taylor & Hinds

[57] ABSTRACT

The seat cushion is constituted by a block of elastically compressible foam covered with a cap comprising a supporting "top" surface of cloth or similar material closely bonded to the upper surface of the block of foam on forming the latter and a skirt engirdling said block of foam. The skirt is attached to the overhanging edges of the top after molding of the block.

6 Claims, 8 Drawing Figures

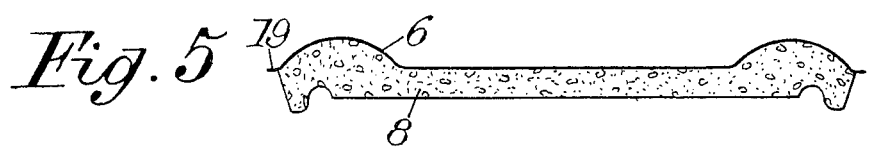
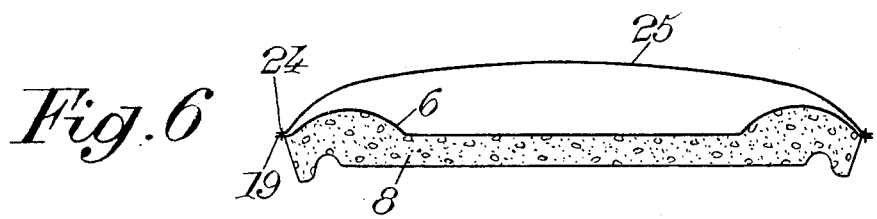
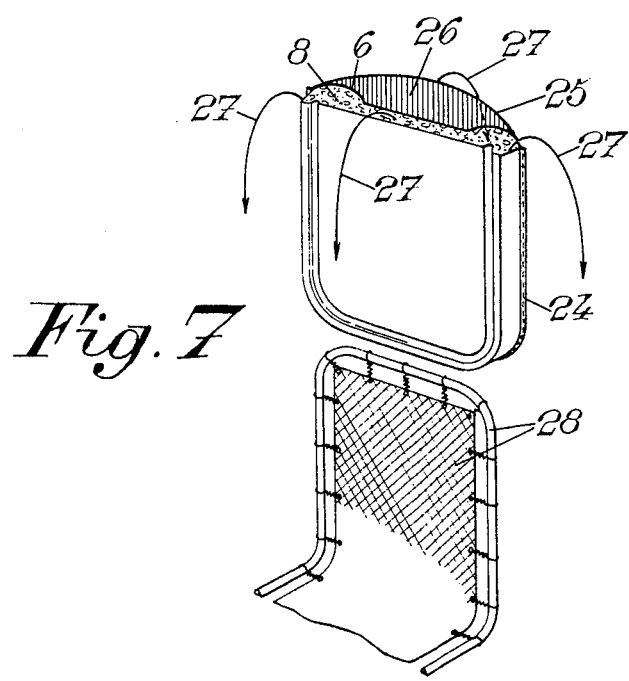
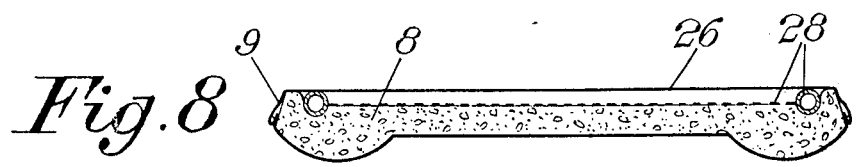

SEAT CUSHIONS AND IN METHODS AND DEVICES FOR THEIR MANUFACTURE

The invention relates to seat cushions constituted by an elastically compressible foam covered with a cap and it relates more particularly, because it is in their case that its application seems to offer the most advantage, but not exclusively, among these cushions, to those which equip vehicle seats (bottom cushions, backs, arm rests, head rests).

It relates also to methods and devices for the manufacture of these cushions.

To manufacture cushions of the type concerned it is known:
  to resort to a mold comprising a hollow pan whose inner surface represents as a hollow the outer surface (top and lateral surfaces) of the cushion to be manufactured and a cover, the bottom of the pan being advantageously pierced with orifices capable of being connected to a source of vacuum,
  and to form successively "in situ", that is to say in the same mold, the cap and the foam, the latter being thus intimately enveloped in the cap on its formation by molding.

In certain of these known methods, to form the cap, there is placed on the edges of the pan a flat sheet, then the latter is deformed so as to make it mate the inner surface of the pan by connecting to a source of vacuum the orifices formed in the bottom of the latter, with if necessary heating of the sheet.

These known methods have some drawbacks, of which the following may be mentioned: the sheet intended to constitute the cap must be very deformable to be able to line at the same time not only the bottom, but also the lateral surfaces of the hollow pan, which are generally oriented perpendicularly to this bottom over a distance of the order of 10 cm, which necessitates constituting said sheet of a plastics material.

Now it is known that a coating of plastics material on the support surface of the cushion is often less agreeable than a cloth surface, which is less slippery, more porous, softer and more pleasant both to the touch and to the eye.

To overcome this drawback, it has already been proposed to constitute by two separate elements:
  on the one hand the support surface or "top" of the cap, which surface is attached to the upper surface of the block of foam and constituted by cloth or other "noble" material,
  and on the other hand the skirt surrounding said block of foam, which skirt is preferably constituted of economical material such as a plastics material.

However in known constructions of this type, the top and the skirt were both intimately bonded against the facing surfaces of the block of foam, said block being formed in a mold lined internally by separate sheets intended to form respectively this top and this skirt.

Such a solution had several drawbacks:
  the adhesion between the skirt and the adjacent foam stiffens said skirt and hampers its freedom of deformation on the elastic movement of the cushion: it causes the formation in this skirt of puckering which is not only unsightly, but also can lead to splits and tears at the level of the crease-lines;
  this adhesion makes difficult the attachment of the base of the skirt to the body of the cushion, in view of the fact that this operation must involve traction on this base, with the risk of tearing-away from the foam adhered against it,
  the joint between the top and the skirt is not ensured firmly and there are risks of tearing-away at least one of the juxtaposed edges of these two elements at the level of their line of junction, which spoils both the appearance and the life of the cushion.

It is an object of the present invention to overcome these various drawbacks.

According to the invention, only the top is bonded against the upper surface of the block of foam on the formation of the latter, the sheet intended to constitute this top being dimensioned so as to present overhanging edges after unmolding the block, and the skirt is attached to these edges after molding of the block.

In preferred embodiments, at the moment when the skirt is assembled on the edges of the top, it is arranged on the side, of this top, opposite that of the block, then after its assembly it is folded back on the flanks of the block by folding-back.

In certain cases, and in particular in those where the cushion concerned is intended to equip a seat back, the skirt is advantageously constituted by the peripheral margin of a continuous flexible panel of which the periphery is attached to the edges of the top after molding of the block, said panel extending into the cushion terminated over the whole extent of the surface, of the block, opposite its top.

When the block of foam is of relatively slight thickness, the assembly of such a panel on the cushion is preferably effected by partially attaching its periphery to the edges of the top so that this panel is disposed on the side of this top, opposite the block of foam, the passage of the panel to the other side of the block of foam being then ensured by simply turning-back the pocket formed by the assembly of the block with its top and of the panel attached to the latter, said turning-back being preferably conducted so as to cause the turned-back pocket to straddle directly the support body of the block of foam.

The invention comprises, apart from these main features, certain other features which are preferably used at the same time and which will be more explicitly considered below.

In the following two preferred embodiments of the invention will be described with reference to the accompanying drawings, this of course being intended as being in no way limiting.

FIG. 1 of these drawings shows in vertical half-section a manufacturing mold for a cushion constructed according to the invention providing for the first step in the manufacture of this cushion.

FIG. 5 shows in cross-section a blank of a cushion for a seat back constituted by a molded block of foam covered with its back.

FIG. 6 shows also in cross-section a pocket constructed according to the invention, which pocket is constituted by the preceding blank coated with its top and by a "bottom" attached to this top.

FIG. 7 illustrates in diagrammatic perspective the phase of turning-back, according to the invention, of this pocket on a seat back body.

And FIG. 8 shows in cross-section the seat back thus produced.

Figure 1:
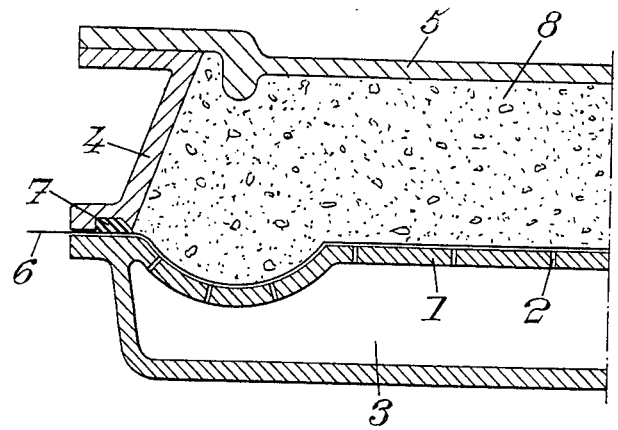

The mold illustrated in FIG. 1 comprises three elements:

a bottom 1 perforated with holes 2 which communicate with a lower chamber 3 capable of being connected to a source of suction, said bottom having a generally flat shape whilst comprising, formed as a negative in its upper surface, the hollows and reliefs of the top of the cushion to be manufactured;

a frame 4 adjustable over the periphery of this bottom 1, and whose inner surface corresponds substantially with the bare flanks of the block of foam to be manufactured;

and a cover 5 adjustable over the periphery of the frame 4.

To manufacture a cushion by means of such a mold procedure is as follows.

The chamber 3 being connected to the atmosphere and the elements 4 and 5 being removed, there is applied to the bottom 1 a flat sheet 6 constituted of a noble material, that is to say at the same time resistant to wear, porous, pleasant and warm to the touch and to the eye such as cloth, velvet, leather . . . .

The dimensions of this sheet are greater than those of the base of the frame 4.

Suction is generated in the chamber 3, which sucks said sheet against the bottom 1 thereby causing it to mate exactly the shape of this bottom possibly with deformations of relatively slight amplitude.

If necessary, this suction is assisted by passing the hand or a suitable pad over the outer surface of the sheet.

The frame 4 is then applied to the thus lined bottom 1, which grips the edges of the sheet 6 between the respective edges of the bottom 1 and of the frame 4, with the interposition if necessary of at least one sealing joint 7.

Then, whilst maintaining the suction in the chamber 3, if necessary, the formation of the foam 8—generally of polyurethane—is effected in the mold in any desirable way, with or without heating, the cover 5 being closed during at least a part of said formation.

When this foam formation is completed, the cushion blank produced is demolded.

Then, if necessary, the overhanging edges of the sheet 6 are cut, after which there is attached to these edges a sort of belt 9 forming the lateral skirt of the cap covering the bared flanks of the block of foam 8 formed.

This skirt can be constituted of a less noble material than that constituting the sheet 6 due to the fact that it is not intended for supporting occupants of the cushion: this material is advantageously a thin sheet of plastics material such as polyvinylchloride.

Its fixing on the overhanging edges of the sheet 6 can be effected in the form of a bead or piping 10 projecting towards the outside of the cushion.

This fixing is advantageously achieved in the following manner.

The belt 9 is arranged so that it extends on the side, of the sheet 6, opposite that of the block of foam 8 and at one of its borders 22 (FIG. 2) lies along the overhanging edges 19.

The free facing margins of the two sheets 6 and 9 (edge 19 and border 22) are applied against one another and they are mutually assembled by means of a sewing machine or a welding machine shown diagrammatically by the arrows 23.

To this end the machine 23 can be gradually moved all around the block or the block can be made to pass across this machine which is then fixed, if necessary with the aid of automatic means or comprising at least guides with templets and/or roller wheels.

Figure 3:
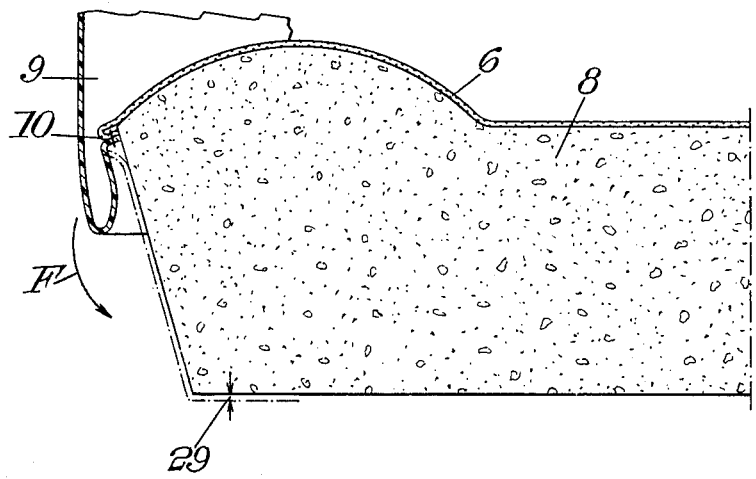

When the assembly is completed, the skirt 9 is turned back around the block of foam 8 by turning it back like a sock along the arrow F (FIG. 3).

The base of said skirt 9 is then attached at 29 to the lower surface of the block of foam 8 and/or to the lower elastic or rigid structure which supports this block in the cushion, and this by any desirable means (stapling or the like).

The absence of adhesion between the skirt and the lateral facing surface of the block of foam (surface generally coated with a relatively smooth skin provided from molding with the block) renders this attachment very simple: although the latter may cause a traction on the base of the skirt to intervene, there is no risk of tearing-away between the latter and the foam.

This absence of adhesion achieves also a total freedom of deformation of the skirt on the elastic working of the cushion, this skirt not being obliged to follow exactly the deformation of the facing lateral surfaces of the block, which avoids risks of forming unsightly and fragile creases.

In addition the method of assembly provided between the top and the skirt ensures a firm bond between the latter, which bond has a particularly esthetic appearance when the line of junction is hidden by turning-back the skirt after its assembly.

Figure 2:
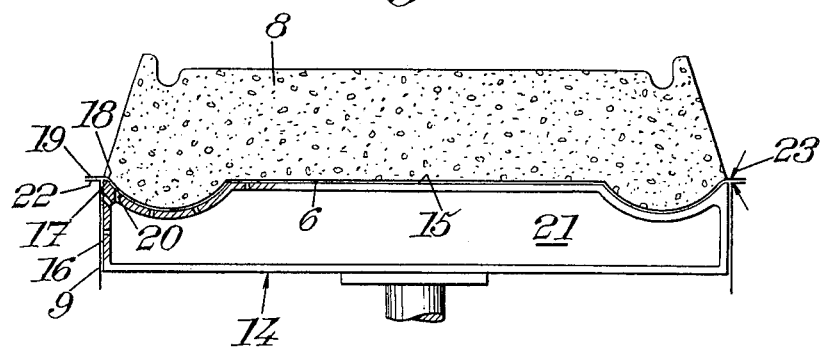
FIGS. 2 and 3 illustrate a method of carrying out the second step of this manufacturing method at two successive moments respectively.

In FIG. 2 there is illustrated a hollow support 14 capable of facilitating the assembly operation.

The upper surface 15 of this support represents in negative the outer shape of the "top" of the cushion to be manufactured and the lateral surface 16 of said support is connected along a projecting crest 17 (with a sharp or rounded angle) to said upper surface at the level of the root 18 of the overhanging edges 19 of the top 6 of the blank.

These two surfaces 15 and 16 are perforated with orifices 20 communicating with the inner chamber 21 of the hollow support and through which suction may be applied.

To assemble the border 22 of the skirt 9 on the edges 19, the blank 6-8 is placed on the support 14 so as to apply its "top" 6 against the surface 15 and the skirt 9 is placed around the support, against its lateral surface 16.

The intimate application of the two sheets 6 and 9, or at least of the roots of their free margins (edges 19 and border 22) against the facing surfaces of the support, for their mutual assembly, is ensured by suction of these sheets or roots through the orifices 20.

Figure 4:
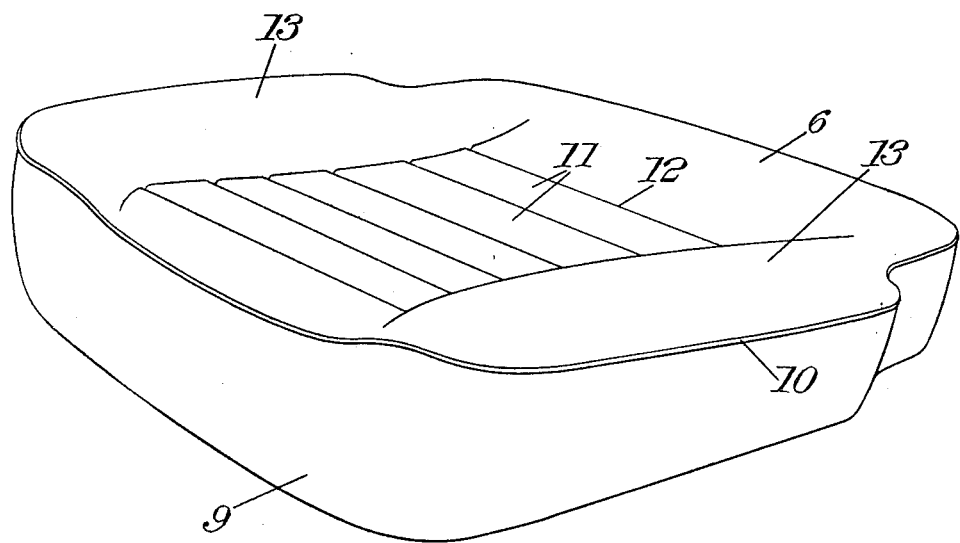
FIG. 4 shows in perspective a cushion according to the invention thus produced.

There is seen at 11 in FIG. 4 parallel padded sides formed in the top 6 and separated from one another by grooves 12. There is also seen in this FIG. 4 two elevated longitudinal borders 13 enabling the centering and lateral support of the seat of the person sitting on the cushion, if the latter is intended to equip a seat bottom.

In the embodiment described above, the skirt is reduced to a belt engirdling the block of foam along the periphery of the "top".

In other words the cap formed does not envelope the said block entirely, leaving "open" the "bottom" of the latter, that is to say its surface opposite its top.

Now for certain cushions, and in particular for those which equip seat backs, it may be advantageous that the cap formed should envelope the whole of the block of foam and the body which supports it and extend in particular over the whole surface, of this assembly, which is opposite the "top" of the cushion.

This is the case in the embodiment illustrated in FIGS. 5 to 8, relating to a seat back.

As above, the method is started by preparing a seat back cushion blank comprising a molded block of foam 8 covered, on the formation itself of the foam, with a supporting surface or "top" 6 having an overhanging edge 19.

There is then attached to this edge 19 along the line 24, by sewing, welding or any other method, not the edge of a simple belt or peripheral skirt, but that of a continuous flexible panel 25 whose peripheral zone is intended to constitute such a skirt 9 in the finished cushion, the surface, of this panel 25, which it is finally desired to make appear on the outside of the cap in the finished back being directly placed against the "top" 6 and oriented towards the latter.

The dimensions of said panel are determined as a function of the shape of the final back equipped with its cap: this panel is hence not generally applied with clamping against the top, but floats on the latter by forming a "pocket" with it.

In order that this pocket may then be able to be turned-back and mounted on the support body of the cushion, it must be open.

The connection of the border of the panel with the top is therefore interrupted over a certain distance so as to reserve laterally in the pocket an opening 26 (FIG. 7) sufficient for said turning-back.

The pocket concerned is then turned-back in the manner of a sock or a glove-finger, that is to say along the arrows 27, above the support body 28 of the cushion so as at the same time:
  to cause the appearance on the outside of the cap of the surfaces arranged initially mutually facing the inside of the pocket,
  and to cover said body 28 with the turned-back pocket.

This rather surprising turning-back is made possible by the great flexibility of the block of foam and of its covering.

In fact experience has shown that, due to its relatively slight thickness, this coated block lends itself easily, just like the flexible panel 25 to the propagation, over its whole extent, of the deformation of flexion to 180° necessitated by said turning-back.

This turning-back assures at the same time the accurate assembly of the cushion on its support body and the strict positioning of the cap around the assembly, the "top" 6 covering the front surface, of the back, which is intended to support the back of the person seated and the flexible panel or "bottom" 25 forming the rear portion of the cap or "cover" thus placed in position.

The said panel 25, generally stretched as seen in FIG. 8, protects and hides the body of the back towards the rear, which body is thus completely enveloped, as is often desirable for seat back bodies: the base of the envelope placed in position can itself be closed in any suitable way if desired.

It may be noted in addition that, as for the embodiment of FIGS. 1 to 4, the above turning-back enables the automatic concealment of the welding or sewing line 24 along which the panel 25 is fixed on the edge 19, which is especially esthetic.

The continuous flexible panel 25 can of course be constituted in any desirable way, either by a single piece formed for example by thermoforming, or in several separate pieces assembled against one another by sewing or welding.

As is self-evident, and as emerges already from the foregoing, the invention is in no way limited to those types of application and embodiments which have been more especially envisaged; it encompasses, on the contrary, all modifications.

I claim:

1. A method for manufacturing seat cushions, said method comprising the following steps:
  providing a mold having a bottom portion and a frame;
  lining the bottom portion of said mold with a flat sheet of material, such as cloth, so that the edges of the material overhang the bottom portion of the mold;
  placing the frame on the mold bottom portion lined with the sheet so as to clamp the overhanging edges of the sheet between the bottom portion and the frame;
  forming a foamed block within the mold constituted by the bottom portion and the frame so that the sheet is bonded to a surface of the block;
  unmolding the block;
  attaching a skirt to the overhanging edges of the sheet; and
  turning the attached skirt on the sides of the foamed block so as to engirdle the block and hide the line of attachment between the skirt and said overhanging edges of the sheet.

2. Method of manufacture according to claim 1, wherein the overhanging edges of the sheet are cut after molding the block of foam and before attaching the skirt to these edges.

3. Method of manufacture according to claim 1, comprising attaching the skirt to the overhanging edges of the sheet by sewing.

4. Method according to claim 2, wherein the turning-back is effected so as to straddle the block directly by the turned-back pocket.

5. A method as claimed in claim 1 wherein said foamed block is of relatively small thickness and said skirt comprises a portion of the peripheral margin of a continuous flexible panel, said method comprising attaching the edge of said panel to the overhanging edges of the sheet along a selected portion of the periphery of said panel so that the panel is located on the side of the sheet opposite said foamed block and an open pocket is formed between the panel and the sheet, and transposing the panel to a position adjacent said block by turning back said open pocket.

6. A method as claimed in claim 1 comprising attaching the skirt to the overhanging edges of the sheet by welding.

* * * * *